US011001700B2

(12) United States Patent
Liu et al.

(10) Patent No.: US 11,001,700 B2
(45) Date of Patent: May 11, 2021

(54) EGGSHELL POWDER COMPOSITIONS AND METHODS OF PRODUCING EGGSHELL POWDER COMPOSITIONS

(71) Applicant: TYSON FOODS, INC., Springdale, AR (US)

(72) Inventors: Yongcheng Liu, Fayetteville, AR (US); Ke-Wei Wang; Michael Blanchard, Farmington, AR (US); Clive Li, Farmingdale, NY (US); Gary Metzger, Farmingdale, NY (US)

(73) Assignee: Tyson Foods, Inc., Springdale, AR (US)

( * ) Notice: Subject to any disclaimer, the term of this patent is extended or adjusted under 35 U.S.C. 154(b) by 226 days.

(21) Appl. No.: 14/357,944

(22) PCT Filed: Nov. 16, 2012

(86) PCT No.: PCT/US2012/065639
§ 371 (c)(1),
(2) Date: May 13, 2014

(87) PCT Pub. No.: WO2013/075003
PCT Pub. Date: May 23, 2013

(65) Prior Publication Data
US 2014/0323616 A1  Oct. 30, 2014

Related U.S. Application Data

(60) Provisional application No. 61/560,973, filed on Nov. 17, 2011.

(51) Int. Cl.
*C08L 23/04* (2006.01)
*C08L 23/10* (2006.01)
*C08K 11/00* (2006.01)
*B02C 19/06* (2006.01)
*B02C 23/14* (2006.01)
*C08L 9/06* (2006.01)
*C08L 23/06* (2006.01)
*C08L 23/14* (2006.01)
*C08L 25/06* (2006.01)
*C08L 33/10* (2006.01)
*C08L 67/04* (2006.01)
*C08L 77/02* (2006.01)

(52) U.S. Cl.
CPC .............. *C08K 11/00* (2013.01); *B02C 19/06* (2013.01); *B02C 23/14* (2013.01); *C08K 11/005* (2013.01); *C08L 9/06* (2013.01); *C08L 23/04* (2013.01); *C08L 23/06* (2013.01); *C08L 23/10* (2013.01); *C08L 23/14* (2013.01); *C08L 25/06* (2013.01); *C08L 33/10* (2013.01); *C08L 67/04* (2013.01); *C08L 77/02* (2013.01); *Y10T 428/2982* (2015.01)

(58) Field of Classification Search
CPC . C08K 11/00; C08K 11/005; Y10T 428/2982; B02C 19/06; B02C 23/14
See application file for complete search history.

(56) References Cited

U.S. PATENT DOCUMENTS

| 5,285,750 | A | 2/1994 | Molian et al. |
| 6,221,928 | B1 | 4/2001 | Kozma et al. |
| 2003/0209617 | A1* | 11/2003 | MacNeil .................. A23J 1/08 241/24.12 |
| 2004/0180025 | A1 | 9/2004 | Long et al. |
| 2006/0068185 | A1* | 3/2006 | Arias Bautista ....... C08K 5/005 428/292.1 |
| 2006/0292356 | A1* | 12/2006 | Minagoshi ............ B60C 1/0016 428/295.1 |
| 2008/0166447 | A1 | 7/2008 | Strohbehn et al. |
| 2009/0124756 | A1* | 5/2009 | Morimoto ........... B43L 19/0025 525/173 |
| 2010/0254900 | A1 | 10/2010 | Campbell et al. |

(Continued)

FOREIGN PATENT DOCUMENTS

| ES | 2181580 | A1 * | 2/2003 |
| JP | 08173838 | A * | 7/1996 |

(Continued)

OTHER PUBLICATIONS

Nishida et al; Mar. 2010; XP-002738645.*
Machine translation of JP 08-173838 A; Inou et al; Jul. 1996.*
U.S. Appl. No. 61/333,161; New; filed May 2010.*
U.S. Appl. No. 61/261,921; Minatelli et al; filed Nov. 2009.*
Tyson Foods, Inc., PCT/US2012/065639, International Preliminary Report on Patentability dated May 20, 2014.
Tyson Foods, Inc., EP 12850073.3, Search Report dated May 7, 2015.
Tsai, W T et al., Characterization and adsorption properties of eggshells and eggshell membrane, Bioresource Technology, Elsevier BV, GB, vol. 97, No. 3, Feb. 1, 2006, pp. 488-493.

(Continued)

*Primary Examiner* — Karuna P Reddy
(74) *Attorney, Agent, or Firm* — McAfee & Taft

(57) ABSTRACT

A process for manufacturing eggshell powder for use in the production of bio-based products is provided. The process involves exposing a quantity of eggshell to high air speed at room temperatures to pulverize the eggshell and separate the eggshell component from the inner membrane component. Thus, the process avoids the use of high temperatures and other harsh chemical treatments to remove the inner membrane from the eggshell thereby resulting in an eggshell material that retains the original lipid-protein structure of the native eggshell from which the powder derives. Accordingly, an eggshell powder composition is provided that is substantially free of inner membrane material and possesses a lipid-protein structure substantially similar to that of the eggshell from which the powder is derived. A polymer composite composition comprising an eggshell component and a polymer component is also provided.

47 Claims, 1 Drawing Sheet

(56) References Cited

U.S. PATENT DOCUMENTS

2011/0020316 A1* 1/2011 Minatelli ............ A61K 31/122
                                              424/94.63
2011/0272502 A1* 11/2011 New .................... A47J 43/145
                                              241/18
2011/0272858 A1   11/2011 Tamir

FOREIGN PATENT DOCUMENTS

WO            0128691 A1    4/2001
WO     WO 2012036645 A2     3/2012

OTHER PUBLICATIONS

WPI World Patent Information Derwent, vol. 1986, No. 5, Dec. 21, 1985, XP002159995.
Toro et al., "Eggshell, a new bio-filler for polypropylene composites," Materials Letters, North Holland Publishing Company, Amsterdam, NL, vol. 61, No. 22, Aug. 8, 2007, pp. 4347-4350.
Database WPI Week 201164, Thomson Scientific, London, GB and JP 2011 184269 A (Wada Kigata Seisakusho KK) Sep. 22, 2011.
Sivarao M R et al., "Mechanical properties modification of polyethylene (PE) for CaCO3 particulated composites," Advanced Materials Research, Trans Tech Publications Ltd., CH, vol. 264-265 Jan. 1, 2011, pp. 880-887.
Tyson Foods, Inc., PCT/US12/065639, International Search Report and Written Opinion, dated Mar. 7, 2013.

* cited by examiner

EGGSHELL POWDER COMPOSITIONS AND METHODS OF PRODUCING EGGSHELL POWDER COMPOSITIONS

BACKGROUND

In order to provide more environmentally-responsible products, manufacturers are exploring alternative approaches to reduce the amount of polymer used to produce various polymer-based products. One such approach involves substituting a portion of the polymer content with a plant-based or "bio-based" filler such as wood flour, starch, or distilled grain. However, plant-based fillers absorb water and swell in a moist or humid environment and degrade at the high temperatures used during processing. This leads to poor product performance and undesirable characteristics.

Eggshell powder is an alternative to the standard plant-based materials. However, attempts to use eggshell powder as a filler in polymer composites has been problematic. First, the inner membrane associated with the eggshell, if left in association with the eggshell during the manufacturing process, produces a foul odor which can carry over into the ultimate product. The traditional methods used to remove the inner membrane from the eggshell involve the use of high-temperatures and/or harsh chemical treatments. This approach not only increases manufacturing costs, but also compromises the native lipid-protein surface structure of the eggshell. As a result, the interface between the eggshell powder and polymer is weakened resulting in sub-optimal product performance.

Therefore, a bio-based or environmentally-responsible filler material is needed for use in manufacturing polymer composites that maintain comparable or improved physical properties without undesirable characteristics and sub-optimal performance ratings.

SUMMARY

The processes and compositions described herein relate to an eggshell powder that possesses improved characteristics for use in polymer composites. To this end, the present invention solves the problems associated with the use of eggshell material as a bio-based filler by providing a process in which the inner membrane is removed from the eggshell without the use of high temperatures or harsh chemical treatments. As a result, the eggshell material retains its native lipid-protein structure thereby permitting a strong interaction with an associated polymer.

A process for producing an eggshell powder is provided. The process involves exposing the eggshell to air flow at a speed sufficient to pulverize the eggshell thereby rendering a bulk pulverized material comprising an eggshell component and a separated inner membrane component. The separated eggshell component is then isolated from the inner membrane component by applying the bulk pulverized material to a first screen comprising a mesh size sufficient to retain the separated inner membrane component on the surface of the first screen while permitting passage of the eggshell component through the first screen. At this point, the collected eggshell component can either be applied to a second screen comprising a mesh size smaller than that of the first screen or re-exposed to the air flow at the same or an increased speed to further pulverize the material and then applied to the second screen. The pulverization step can be repeated additional times at the same or increased air flow speeds until the eggshell component is reduced to the desired particle size.

Additionally, an eggshell powder composition is provided. The eggshell powder composition is substantially free of the inner membrane and retains the lipid-protein structure present in the native eggshell material used to form the powder.

A polymer composite composition is also provided. The composite composition comprises a first component and a second component. The first component comprises a biobased filler consisting of eggshell powder that is void of the inner membrane and possesses the lipid-protein structure of the eggshell material used to form the powder. The second component comprises a polymer. In one aspect, the polymer is a thermoplastic polymer such as, but not limited to, polyolefin (e.g., polyethylene (PE)), polyesters (e.g., polyethylene terephthalate (PET)), polyamide (e.g., nylon), styrenic polymers (e.g., polystyrene), bio-degradable polymers (e.g., polylactic acid (PLA)), and engineering resins (e.g., polycarbonate). In another aspect, the polymer is a thermoset polymer such as, but not limited to, crosslink polymers (e.g., vulcanized rubber), melamine resin, epoxy resin, crosslink polyesters, and polyurethane. In yet another aspect, the composite composition further comprises a third component. The third component comprises one more additives such as, but not limited to, antioxidants, fiberglass fillers, color pigments (e.g., carbon black), and fragrances (e.g., citronella).

BREIF DESCRIPTIONS OF THE DRAWINGS

FIG. 1 is a photograph of a 22 µg water drop on the surface of a sample of eggshell powder of the present invention.

DETAILED DESCRIPTION

The present application claims priority to U.S. provisional application No. 61/560,973 of the same title which is incorporated by reference in its entirety herein.

In one aspect, a process for producing an eggshell powder is provided. The process involves removal of the inner membrane from the eggshell prior to pulverization through a process that does not rely on a liquid carrier or high temperatures, but rather on air flow at low temperatures. Thus, in a preferred embodiment, the entire process of producing eggshell powder described herein can be performed without heating the eggshell material. As a result, an eggshell powder is yielded that retains the lipid/protein structure of the original eggshell surface from which the powder is derived, and is also substantially free of the eggshell inner membrane material.

In some applications, it may be desirable to sterilize the eggshell prior to processing. The sterilization step can be performed by a number of different methods which are generally known to those skilled in the art. For example, the eggshell can be exposed to a moist heat treatment of a temperature sufficient to eliminate various pathogens and microorganisms. Moist heat treatments include, but are not limited to passing steam infused water through a quantity of shells or simply steam treating the eggshells. Other potential methodologies include exposing the eggshells to UV light, high energy radiation, chemical treatment or reducing the available water (AW).

Following the optional sterilization step, one or more pulverization steps are performed to crush the eggshell to a desired particle size and to remove the inner membrane from the eggshell. Pulverization is preferably performed using high speed air flow at low temperatures. The determination of air speed will largely be dependent on the type of apparatus used, but regardless, should be sufficient to cause separation of the eggshell component from the inner membrane component. Example 1 provides an initial pulverization using an air speed of 3,500 rpm in a pulverdryer which provides a good basis to determine the air speed required to obtain the same result in related air flow equipment. The pulverization step can be performed using a vortex dryer, cyclone wind tunnel or any other apparatus that provides sufficient air speed to crush the eggshell and separate it from the inner membrane. The initial pulverization step should be sufficient to separate the eggshell from the inner membrane. Thus, any additional pulverization steps can be employed to further dry and reduce the particle size of the eggshell component. If a reduced particle size is desired, the air speed can be increased from about 3,500 rpm to about 10,000 rpm and any range therebetween.

The initial pulverization step results in the production of a bulk pulverized material consisting of an eggshell component and inner membrane component. The next step is then to isolate the eggshell component from bulk pulverized material so that the resulting eggshell powder does not contain any of the inner membrane component. This can be performed by applying the bulk material to a mesh screen of a size sufficient to permit the eggshell component to pass through the screen while retaining the inner membrane component on the surface of the screen. For example, the bulk material can be applied to an ASTM 20 mesh screen. However, any number of approaches could be used by a skilled artisan to achieve the same ends as long as the eggshell component can be collected free from the inner membrane component.

The pulverization step can then be repeated for the entire eggshell component or only with respect to the large eggshell component particles (approximately greater that 100 μm) until a desired particle size is reached. The large eggshell component particles can be separated from the remaining eggshell component by using appropriately sized mesh screens. The subsequent pulverizing steps can be performed under the same conditions as the initial step or with higher air speeds for the same or longer time periods. If a specific particle size is desired, the pulverized eggshell component can be sifted through a screen having a particle size specific for the intended use of the eggshell powder. For example, an ASTM 270 mesh screen having a particle size of 53 μm.

The present process yields an improved eggshell powder that retains the lipid-protein structure of the original eggshell from which it is derived and is substantially free of eggshell inner membrane material. Thus, in another aspect of the present invention, an eggshell powder composition is provided. The eggshell powder composition possesses an ash content of about 90-95% and a moisture content from about 0.2% to about 5%, but is generally less than 1%. Of the ash content, approximately 33-36% is calcium in addition to less than 1% of each of magnesium, phosphorus, potassium, and sodium. The calcium content consists substantially of calcium oxide and other metal oxides rather than calcium carbonate. The fat content of the eggshell powder can be in the range of about 0.01% to about 3%, but is generally less than 1%. The protein content is generally less than 5% and more specifically, from about 0.2% to about 3%.

Furthermore, the present eggshell powder retains the original lipid/protein structure of the native eggshell surface from which the powder is derived. As a result, the present eggshell powder possesses hydrophobic properties. FIG. 1 demonstrates the hydrophobic properties of the eggshell powder by providing a photograph of a drop of water (approximately 22 μg) being retained on the surface of the present eggshell powder. The drop possesses a water contact angle indicative of a hydrophobic material.

The hydrophobic, lipid/protein structure of the present eggshell powder is more similar to polymer structure than traditional minced calcium carbonate thereby providing an improved interaction with the polymer matrix. As a result, the use of the present eggshell powder in a polymer composite provides improved mechanical properties such as impact resistance and tensile strength as compared to polymer alone, which is demonstrated in Example 5 herein below.

The particle size of the present eggshell powder is, for example, generally less than 100 μm and can be from about 10 μm to about 100 μm. Depending on the intended use of the powder, the particle size is more preferably from about 20 μm to 50 μm. Particle size can be controlled by, for example, using screen filters with the desired mesh sizes and by repeating the pulverization step as described above. For example, the particle size yielded by using an ASTM 150 mesh screen is generally less than 104 μm whereas the particle size yielded by an ASTM 325 mesh screen is generally less than 44 μm.

Although the eggshell powder composition described herein is isolated from chicken eggs, it should be understood that other types of eggshells can be used to yield a similar powder such as, but not limited to, shells from turkey eggs, duck eggs, and other bird eggs.

In another aspect of the current invention, a polymer composite composition is provided. The composite composition comprises a first component consisting of a bio-based material, a second component consisting of a polymer, and in some instances a third component such as an additive or additional filler material. For example, the first component comprises eggshell powder that is substantially free of eggshell inner membrane and retains the original lipid-protein surface structure of the eggshell from which the powder was derived. The particle size of the eggshell powder can be any size desired and most effective for the particular polymer used in the composite. For example, the powder particle size can be from about 10 μm to about 100 μm and more specifically, from about 20 μm to 50 μm.

The second component comprises a polymer. In some instances, the polymer is a thermoplastic polymer such as, but not limited to polyolefin (e.g., polyethylene, ethylene vinyl acetate, ethylene methyl acrylate, polypropylene, polybutylene, polymethyl pentene), styrenic polymers (e.g., general purpose polystyrene, impact modified polystyrene, acrylonitrile butadiene styrene, butadiene styrene copolymer, styrene maleic anhydride copolymer, polystyrene methyl methacrylate copolymer), polyesters (e.g., polyethylene phthalate, polybutylene phthalate, polylactic acid), bio-degradable polymers (e.g., polylactic acid, polycaprolactone, polyvinyl alcohol, polyglycolic acid, polyalkene succinate, aliphatic-aromatic copolyesters, polyanhydrides, and polyhydroxyalkanoate), polyamides (e.g., nylons), and engineering resins (e.g., acetyls, allyl resins, cellulosic resins, chlorinated polyethylene, fluoropolymers, fluorocarbon polymers, liquid crystal polymers, phenolic resins, polyaryl sulfone, polyal lowers, polyamide, polyacrylate, polyethersulfone, polymethyl methacrylate, polyphenyl sulfone, polyphenylene ether, polyphenylene oxide, polyphenylene sulfide, polysulfone, polyurethane, polyvinyl chloride and polycarbonate). In other instances, the polymer is a thermoset polymer such as, but not limited to crosslink polymers (e.g., vulcanized rubber), melamine resin, vinyl ester, epoxy resin, crosslink polyesters, phenolics, melamine resins, and polyurethane.

Additionally, the composite composition can further comprise a third component in some instances. The third component can comprise one or more additives such as, but not limited to, heat stabilizers, antioxidants, UV/light stabilizers, antistatic agents, antifogging agents, lubricants, processing aids, anti-blocking agents, slipping agents, mold-releasing agents, flame-retardant agents, chemical-blowing agents, crosslink agents, nucleating agents, antimicrobial agents, coupling agents, gas scavengers, acid and base scavengers, water scavengers, odor controlling agents, and food flavoring agents.

Alternatively, the third component can include a filler material such as, but not limited to calcium carbonate, dolomite, magnesium carbonate, calcium sulfate, barium sulfate, silica, carbon black, talc, mica, kaolin, clay, graphite, wollastonite, whiskers, glass fiber, carbon fiber, conductive filler, nano-filler, organic filler (including wood flour, cellulose fiber and distilled drained grain), and colorant (including pigment, dye, and fluorescent whitening agent).

The percentage of eggshell powder in the composite ranges from 1% to 90% by weight, from about 30% to 50% by weight, and in many applications is at least 25% by weight. A product made from a composite composition comprising 25% biobased material is suitable to label as "biobased" under USDA regulations. Moreover, the percentage of eggshell powder in the composite is a function of the type of polymer structure desired. The eggshell/polymer composites can be molded into a variety of commercial plastic products including, but not limited to chips, boxes, trays, barrels, golf tees, and disposable bins.

The eggshell powder described herein is integrated with the associated polymer by extrusion; a process in which polymeric resins, eggshell powder, and optionally, other ingredients such as additives and pigments are fed into an extruder barrel with one or more rotating screws. The screw forces the mixture forward in the extruder barrel which is heated to a melting temperature of the particular polymer, and then forces the molten mixture (composite) out of the extruder. The extruded composite is generally then cut into pellet form and subjected to further manufacturing processes such as injection molding, blow molding, extrusion and thermoforming.

In composites comprising thermoset polymers, the present eggshell powder is integrated with the thermoset polymers by first adding monomers to the powder, cross-linking agent and/or other fillers such as fiberglass or color pigment into a cavity of the mold. Pressure is then applied to force the mixture to the cavity voids. The mixture is then annealed at a temperature above the curing temperature to allow the monomer to cure.

Therefore, in one embodiment, the process for producing a composite of eggshell powder and a polymer is provided. The process includes following steps:
(1) mixing eggshell powder with the polymer and in some instances other additives or fillers at various composition ratios either manually or in a mixing machine under conditions sufficient to produce a homogeneous mixture;
(2) extruding the polymer/eggshell powder mixture in an extruder operating at an appropriate temperature profile for the die, metering zone, compression zone, and feed zone of the extruder suitable for the desired polymer;
(3) pelletizing the extruded strand in an air bath or a water bath;
(4) drying the pellets; and
(5) subjecting the dried pellets of eggshell powder/polymer composite to various types of manufacturing processes including, for example, injection molding, final products at an injection pressure, speed, and a temperature profile for the feed zone, heated barrel zone, screw zone, heated chamber/melting zone, and injection nozzle appropriate for the particular polymer product desired.

The temperature profiles to be used in the extrusion and molding process for various polymers are set forth in Table 1. In instances in which polylactic acid, nylon 6, and nylon 66 are used as the polymer, an initial masterbatch is mixed and extruded under the appropriate conditions followed by a second mixing step in which the masterbatch is mixed with the virgin polymer prior to the injection molding process.

TABLE 1

Temperature profiles for extrusion and injection molding of various polymers

| Polymer | Extruding Temperature Range (° C.) | Injection Molding Temperature Range (° C.) |
| --- | --- | --- |
| Polyethylene | 120°-150° | 140°-160° |
| High Density Polyethylene | 130°-160° | 140°-160° |
| Polypropylene | 160°-190° | 160°-200° |
| Polylactic Acid | 170°-200° | 160°-190° |
| High Impact Polystyrene | 170°-250° | 170°-250° |
| Acrylonitrile Butadiene Styrene | 210°-250° | 210°-250° |
| Nylon 6 | 140°-250° | 140°-250° |
| Nylon 66 | 200°-250° | 200°-250° |

The following examples describe specific eggshell powder compositions and a process of producing such as well as polymer composite compositions formed using the processes described herein. The following examples are solely for purposes of illustrating certain aspects of the invention and not for the purpose of limitation.

EXAMPLE 1

Production of Eggshell Powder from White and Brown Eggs

In this example, a vortex dryer or pulverdryer was used to crush the eggshell material obtained from a group of white eggs and brown eggs and separate the eggshell material from the inner membrane material. In this instance, the initial pulverization was performed at the following conditions: (1) air speed—3,500 rpm; (2) feeding time—10 seconds; (3) cycling time—0 seconds; (4) discharging time—10 seconds; (5) feed rate—8 kg/time; and (6) temperature—room temperature. This resulted in the production of a bulk pulverized material consisting of an eggshell component and an inner membrane component. The bulk pulverized material was then applied to an ATSM 20 mesh screen to separate the inner membrane component, which was retained on the screen, from the eggshell component, which passed through the mesh. The inner membrane component and eggshell component were each collected and the moisture content analyzed. The inner membrane component possessed a moisture content of approximately 36.4% whereas the eggshell component had a moisture content of 5.85%.

The pulverization procedure was then repeated to further dry and decrease the particle size of the eggshell component. Pulverization was performed under the following conditions: (1) air speed—5,700 rpm; (2) feeding time—10 seconds; (3) cycling time—15 seconds; (4) discharging time—10 seconds; (5) feed rate—16 kg/time; (6) baghouse—60%; and (7) temperature—room temperature. The eggshell component was collected and moisture determined to be 1.1%.

The eggshell component from the second pulverization run included some larger particle sizes so the pulverization was repeated for a third time. The third pulverization was performed under the following conditions: (1) air speed—10,000 rpm; (2) feeding time—10 seconds; (3) cycling time—20 seconds; (4) discharging time—10 seconds; (5) feed rate—16 kg/time; (6) baghouse—60%; and (7) temperature—room temperature. The eggshell component (powder) was collected and analyzed for content. The content analysis for each of the brown eggs and white eggs are provided in Table 2 below.

EXAMPLE 2

Composition Ratios and Manufacturing Conditions for Various Polymer Composite Plaques Formed Using the Present Eggshell Powder Composition Tables 3A and 3B below provide composite composition ratios (Table 3A) and manufacturing conditions (Table 3B) to produce a number of specific polymer composite plaques using the present eggshell powder composition and methods. As used in the tables below, "N/A" denotes that for the specific composite, this step was not performed in this particular example and should not be interpreted to mean that this step cannot be used with the particular composite. Specifically, composites 5 and 6 just proceeded through the extrusion process and in this particular example, did not undergo further manufacturing steps. Extrusion was performed by a twin screw extruder (Amco) for composites 1-4 and single screw extruder for composites 5-6.

TABLE 3A

Polymer/eggshell powder composite composition ratios

| | Polymer | Additive | Masterbatch (MB) | | |
| --- | --- | --- | --- | --- | --- |
| | | | % Eggshell Powder | % polymer | % Additive |
| Composite 1 | polylactic acid | Citroflex A4 (plasticizer) | 60% | 39% | 1% |
| Composite 2 | High-impact polystyrene | mineral oil | 30% | 69.5% | .5% |
| Composite 3 | acrylonitrile butadiene styrene (GP22) | mineral oil | 30% | 69.5% | .5% |
| Composite 4 | nylon 6 & maleic anhydride modified ethyl methyl acrylate (copolymer) | INT-PA33FRK (processing aid) | 60% | 39.5% (MAMEMA) | .5% |
| Composite 5 | polyethylene | Glycolube P (lubricant) | 50% | 49% | 1% |
| Composite 6 | polypropylene (copolymer pellet) | Polybond-300 (maleic anhydride modified polypropylene coupling agent) | 50% | 49% | <1% (approx. 230 grams) |

TABLE 2

Content of eggshell powder

| | White eggshell powder | Brown eggshell powder |
| --- | --- | --- |
| Moisture (%) | 0.46 | 0.20 |
| Protein (%) | 3.92 | 5.04 |
| Ash (%) | 94.61 | 94.28 |
| Fat (%) | 0.35 | 0.08 |
| Calcium (%) | 34.12 | 33.13 |
| Magnesium (%) | 0.29 | 0.36 |
| Phosphorous (%) | 0.04 | 0.07 |
| Potassium (%) | 0.03 | 0.04 |
| Sodium (%) | 0.05 | 0.04 |
| Copper (ppm) | <1 ppm | <1 ppm |
| Iron (ppm) | 22 ppm | <1 ppm |
| Manganese (ppm) | <1 ppm | <1 ppm |
| Zinc (ppm) | <1 ppm | <1 ppm |

TABLE 3B

Manufacturing conditions for the composite compositions described in Table 3A.

| | Extruding Conditions (Temperature and screw speed) | Additional Masterbatch/ Polymer Mix | Injection Molding Conditions |
| --- | --- | --- | --- |
| Composite 1 | 175° C. and 60 rpm | 50% MB w/ 50% virgin polylactic acid | 182° |
| Composite 2 | 195° C. and 60 rpm | N/A | 200° |
| Composite 3 | 215° C. and 60 rpm | N/A | 220° |
| Composite 4 | 145° C. and 60 rpm | 50% MB w/50% virgin nylon 6 | 250° |
| Composite 5 | 130° C. and 60 rpm | N/A | N/A |
| Composite 6 | 170° C. and 60 rpm | N/A | N/A |

EXAMPLE 3

Comparison of Strength Variables Between Virgin Nylon 66 and a Nylon 66/Eggshell Polymer Composite This example demonstrates that the use of eggshell powder to form a polymer composite plaque with nylon 66 results in improved properties as compared to a plaque formed of nylon 66 alone. The eggshell polymer composite plaque was produced according to the following procedure:

(1) a masterbatch comprising 60.0% eggshell powder and 40.0% maleic anhydried modified polypropylene (MAPP) copolymer was mixed in a plastic bag by shaking;

(2) the masterbatch of step 1 was applied to a twin screw extruder operating at 240° C. at a screw speed of 60 RPM screw speed. The product (strand) coming out of the extruder was then quenched in water, followed by grinding into small pellets;

(3) the pellets from step 2 were then mixed with virgin Nylon 66 at a 1:1 ratio in a plastic bag by shaking; and (4) the mixture of step 3 was introduced into an injection molding machine (Amco) at 250° C. to form a nylon 66 composite plaque comprising 30% eggshell powder.

The plaque comprising nylon 66 and 30% eggshell powder was then tested for flexural modulus, tensile strength, and heat deflection at 0.45 MPa and 1.8 MPa. The results are shown in Table 4 below. Table 4 also includes the heat deflection and flexural modulus data of virgin nylon 66 (based on data provided by the manufacturer, BASF). As provided in Table 4, the plaque formed of the nylon 66/eggshell composite displays better properties than virgin nylon 66. Specifically, the composite of nylon 66 and eggshell powder presents higher flexural modulus (3270 Mpa) than nylon 66 itself (2920 Mpa). In other words, the composite of nylon 66 and eggshell powder is stiffer than virgin nylon 66. Furthermore, the composite of nylon 66 and eggshell powder exhibits higher heat deflection temperature at 1.80 MPa (78.3° C.) than nylon 66 (74° C.). This data implies that the composite of nylon and eggshell powder is more deform resistant and has a higher heat resistant capacity than virgin nylon 66. These properties are very important in, for example, automotive applications where resistance to heat is crucial. Therefore, the composite of nylon 66 and eggshell powder may provide improved performance in automotive applications where virgin nylon 66 is traditionally used as it is stiffer and more heat resistant.

TABLE 4

Properties of nylon 66 and the composite of nylon 66 and eggshell powder

| Property | Test Method | Units | Nylon 66 Control | Nylon 66 with 30% eggshell powder and 20% MAPP |
|---|---|---|---|---|
| Tensile Strength at Break | ISO 572 | MPa | — | 51.7 |
| Flexural Modulus | ISO 178 | MPa | 2920 | 3270 |
| Heat Deflection Temperature @ 0.45 MPa | ISO 75 | ° C. | — | 138.1 |
| Heat Deflection Temperature @ 1.80 MPa | ISO 75 | ° C. | 74 | 78.3 |

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A polymer composite composition comprising:
   an eggshell component, wherein the eggshell component possesses a lipid-protein structure substantially similar to that of the eggshell from which the eggshell component is derived, and wherein the eggshell component is substantially free of eggshell inner membrane material; and
   a polymer component.

2. The composition of claim 1, wherein the polymer component is a thermoplastic polymer.

3. The composition of claim 1, wherein the polymer component is a thermoset polymer.

4. The composition of claim 1, wherein the eggshell component constitutes 50% of the polymer composite composition.

5. The composition of claim 1 further comprising an additive component selected from the group consisting of heat stabilizers, antioxidants, UV/light stabilizers, antistatic agents, antifogging agents, lubricants, processing aids, anti-blocking agents, slipping agents, mold-releasing agents, flame-retardant agents, chemical-blowing agents, crosslink agents, nucleating agents, antimicrobial agents, coupling agents, gas scavengers, acid and base scavengers, water scavengers, odor controlling agents, and food flavoring agents.

6. The composition of claim 1 further comprising a filler component selected from the group consisting of calcium carbonate, dolomite, magnesium carbonate, calcium sulfate, barium sulfate, silica, silicate, zeolite, carbon black, talc, mica, kaolin, clay, graphite, wollastonite, whiskers, glass fiber, carbon fiber, conductive filler, nano-filler, wood flour, wood fiber, cellulose fiber, distilled drained grain, pigment, dye, and fluorescent whitening agent.

7. The composition of claim 1 wherein the eggshell component has a particle size from about 10 µm to about 100 µm.

8. The composition of claim 1 wherein the eggshell component is hydrophobic.

9. A bio-based product comprising:
   an eggshell powder, wherein the eggshell powder retains a lipid-protein structure similar to that of the eggshell from which the eggshell powder is derived; and
   a polymer.

10. The product of claim 9, wherein the polymer is a thermoplastic polymer.

11. The product of claim 9, wherein the polymer is a thermoset polymer.

12. The product of claim 9, wherein the eggshell powder constitutes 25% by weight of the total weight of the product.

13. The product of claim 9, wherein the eggshell powder has a particle size from about 20 µm to about 50 µm.

14. The product of claim 9, wherein the eggshell powder is hydrophobic.

15. A process for producing an eggshell powder comprising the steps of:
   exposing a quantity of eggshell to air flow at a speed sufficient to pulverize the eggshell thereby rendering a bulk pulverized material comprising an eggshell component and a separated inner membrane component;
   applying the bulk pulverized material to a first screen comprising a mesh size sufficient to retain the separated inner membrane component on the surface of the first screen while permitting passage of the eggshell component through the first screen; and collecting the eggshell component following passage through the first screen, wherein the eggshell component collected forms a eggshell powder of a first particle size, wherein the first particle size is less than or equal to that permitted to pass through the first screen wherein the eggshell powder possesses a lipid-protein structure substantially similar to that of the eggshell from which the eggshell powder is derived, and wherein the eggshell powder is substantially free of eggshell inner membrane material.

16. The process of claim 15, wherein the first particle size is less than or equal to 100 μm.

17. The process of claim 15, further comprising the step of applying the eggshell powder of a first particle size to a second screen comprising a mesh size sufficient to permit passage of a second particle size, wherein the second particle size is less than the first particle size.

18. The process of claim 17, wherein the second particle size is less than or equal to 50 μm.

19. The process of claim 17, wherein the second particle size is less than or equal to 20 μm.

20. The process of claim 17, further comprising the steps of:

collecting the eggshell powder that is retained on the second screen, wherein the eggshell powder retained on the second screen has a particle size greater than the second particle size;

re-exposing the eggshell powder retained on the second screen to air flow at a speed sufficient to further reduce the particle size; and re-applying the eggshell powder to the second screen.

21. The process of claim 20 wherein the re-exposure of air flow is at a speed of 5,700 rpm for 10 seconds.

22. The process of claim 20 wherein the eggshell powder is exposed to air flow for a third time at a speed of 10,000 for 10 seconds.

23. The process of claim 15, further comprising the step of sterilizing the eggshell prior to pulverizing.

24. The process of claim 15, wherein the eggshell is not heated during the entire process.

25. The process of claim 15, wherein the air flow is at a speed of 3,500 rpm for 10 seconds.

26. The process of claim 15, wherein the step of exposing the eggshell to air flow is performed in a vortex dryer.

27. The process of claim 15, wherein the step of exposing the eggshell to air flow is performed in a cyclone wind tunnel.

28. A composition comprising an eggshell powder, wherein the eggshell powder possesses a lipid-protein structure substantially similar to that of the eggshell from which the eggshell powder is derived, and wherein the eggshell powder is substantially free of eggshell inner membrane material.

29. The composition of claim 28, wherein the eggshell powder has a particle size from about 10 μm to about 100 μm.

30. The composition of claim 28, wherein the eggshell component is hydrophobic.

31. A polymer composite composition, comprising:

an eggshell component having hydrophobic properties and a moisture content from about 0.2% to about 5%, wherein the eggshell component retains the lipid-protein structure of the eggshell from which the eggshell component is derived, and wherein the eggshell component is void of eggshell inner membrane material; and a polymer component.

32. The composition of claim 31, wherein said polymer component is a thermoplastic polymer.

33. The composition of claim 31, wherein said polymer component is a thermoset polymer.

34. The composition of claim 31, wherein said eggshell component constitutes 50% of the polymer composite composition.

35. The composition of claim 34, wherein said eggshell component constitutes 25% of the polymer composite composition.

36. The composition of claim 31, wherein said eggshell component has a particle size from about 10 μm to about 100 μm.

37. The composition of claim 36, wherein said eggshell component has a particle size from about 20 μm to about 50 μm.

38. The composition of claim 31, wherein said polymer component is selected from the group of polyolefins, styrenic polymers, polyesters, bio-degradable polymers, polyamides, engineering resins, crosslink polymers, melamine resin, epoxy resin, crosslink polyesters, and polyurethane.

39. The product of claim 9, wherein said eggshell powder constitutes 50% of the total weight of the product.

40. The product of claim 9, wherein said eggshell powder has a particle size from about 10 μm to about 100 μm.

41. The composition of claim 7, wherein said eggshell component has a particle size from about 20 μm to about 50 μm.

42. The composition of claim 1, wherein said polymer component is selected from the group of polyolefins, styrenic polymers, polyesters, bio-degradable polymers, polyamides, engineering resins, crosslink polymers, melamine resin, epoxy resin, crosslink polyesters, and polyurethane.

43. The composition of claim 31, wherein said eggshell component has a moisture content less than 1%.

44. The bio-based product of claim 9, wherein said eggshell powder has a moisture content from about 0.2% to about 5%.

45. The bio-based product of claim 44, wherein said eggshell powder has a moisture content less than 1%.

46. The polymer composite of claim 1, wherein said eggshell component has a moisture content from about 0.2% to about 5%.

47. The polymer composite of claim 1, wherein said eggshell component has a moisture content less than 1%.

* * * * *